United States Patent
Comeau et al.

(10) Patent No.: US 8,845,457 B2
(45) Date of Patent: *Sep. 30, 2014

(54) GOLF BALL CORES BASED ON POLYALKENAMER RUBBER HAVING POSITIVE HARDNESS GRADIENTS

(75) Inventors: Brian Comeau, Berkley, MA (US); David A. Bulpett, Boston, MA (US); Michael J. Sullivan, Barrington, RI (US); Robert Blink, Newport, RI (US); Douglas S. Goguen, New Bedford, MA (US); Mark L. Binette, Mattapoisett, MA (US)

(73) Assignee: Acushnet Company, Fairhaven, MA (US)

( * ) Notice: Subject to any disclaimer, the term of this patent is extended or adjusted under 35 U.S.C. 154(b) by 262 days.

This patent is subject to a terminal disclaimer.

(21) Appl. No.: 12/855,319

(22) Filed: Aug. 12, 2010

(65) Prior Publication Data

US 2010/0323819 A1 Dec. 23, 2010

Related U.S. Application Data

(63) Continuation-in-part of application No. 12/047,982, filed on Mar. 13, 2008, now abandoned, which is a continuation-in-part of application No. 11/767,070, filed on Jun. 22, 2007, now abandoned, which is a continuation-in-part of application No. 10/773,906, filed on Feb. 6, 2004, now Pat. No. 7,255,656, which is a continuation-in-part of application No. 10/341,574, filed on Jan. 13, 2003, now Pat. No. 6,852,044, which is a continuation-in-part of application No. 10/002,641, filed on Nov. 28, 2001, now Pat. No. 6,547,677.

(51) Int. Cl.
*A63B 37/04* (2006.01)
*A63B 37/00* (2006.01)
*A63B 37/06* (2006.01)

(52) U.S. Cl.
CPC ......... *A63B 37/0051* (2013.01); *A63B 37/0062* (2013.01); *A63B 37/06* (2013.01); *A63B 37/0003* (2013.01); *A63B 37/0066* (2013.01); *A63B 37/0064* (2013.01)
USPC ............ 473/374; 473/371; 473/373; 473/377

(58) Field of Classification Search
None
See application file for complete search history.

(56) References Cited

U.S. PATENT DOCUMENTS

| | | |
|---|---|---|
| 3,492,245 A | 1/1970 | Calderon et al. |
| 3,804,803 A | 4/1974 | Streck et al. |

(Continued)

OTHER PUBLICATIONS

EVONIK Industries; VESTENAMER 8012 Rubber with unique properties; Mar. 2009.

*Primary Examiner* — Gene Kim
*Assistant Examiner* — John E Simms, Jr.
(74) *Attorney, Agent, or Firm* — Daniel W. Sullivan

(57) ABSTRACT

Golf balls having a core comprising a polyalkenamer rubber composition are provided. The rubber composition may further include other rubbers such as, for example, polybutadiene, polyisoprene, ethylene propylene rubber, ethylene propylene diene rubber, and styrene-butadiene rubber. The rubber composition helps improve resiliency of the core and provides the ball with a comfortable and soft feel. In one version, a solid, single core having an outer surface and geometric center is provided, wherein the outer surface has a hardness greater than the hardness of the geometric center to define a positive hardness gradient of at least 10 Shore C. In a second version, a dual-core having an inner core and surrounding outer core layer is provided. The inner core has a positive hardness gradient, while the outer core has a zero; negative; or positive hardness gradient.

11 Claims, 4 Drawing Sheets

(56) References Cited

U.S. PATENT DOCUMENTS

| | | | | |
|---|---|---|---|---|
| 4,183,876 | A | 1/1980 | Coran et al. | |
| 4,792,141 | A | 12/1988 | Llort | |
| 4,840,993 | A | 6/1989 | Bartz | |
| 5,460,367 | A | 10/1995 | Horiuchi | |
| 5,779,562 | A * | 7/1998 | Melvin et al. | 473/373 |
| 5,782,707 | A | 7/1998 | Yamagishi et al. | |
| 6,012,991 | A | 1/2000 | Kim et al. | |
| 6,645,090 | B2 | 11/2003 | Ohama et al. | |
| 6,679,791 | B2 | 1/2004 | Watanabe | |
| 6,686,436 | B2 | 2/2004 | Iwami | |
| 6,702,694 | B1 | 3/2004 | Watanabe | |
| 6,767,940 | B2 | 7/2004 | Voorheis et al. | |
| 6,783,468 | B2 | 8/2004 | Sullivan et al. | |
| 6,786,836 | B2 | 9/2004 | Higuchi et al. | |
| 6,982,301 | B1 * | 1/2006 | Voorheis et al. | 525/193 |
| 6,987,159 | B2 | 1/2006 | Iwami | |
| 7,041,009 | B2 | 5/2006 | Sullivan et al. | |
| 7,044,864 | B2 | 5/2006 | Sullivan et al. | |
| 7,086,969 | B2 | 8/2006 | Higuchi et al. | |
| 7,118,495 | B2 | 10/2006 | Sullivan et al. | |
| 7,125,345 | B2 | 10/2006 | Sullivan et al. | |
| 7,153,224 | B2 | 12/2006 | Higuchi et al. | |
| 7,175,542 | B2 | 2/2007 | Watanabe et al. | |
| 7,226,367 | B2 | 6/2007 | Higuchi et al. | |
| 7,528,196 | B2 | 5/2009 | Kim et al. | |
| 2004/0082407 | A1 * | 4/2004 | Sullivan et al. | 473/371 |
| 2006/0047081 | A1 * | 3/2006 | Ladd et al. | 525/261 |
| 2006/0166762 | A1 * | 7/2006 | Kim et al. | 473/374 |
| 2008/0161133 | A1 * | 7/2008 | Sullivan et al. | 473/376 |
| 2009/0170634 | A1 * | 7/2009 | Loper et al. | 473/373 |
| 2009/0191981 | A1 | 7/2009 | Kim et al. | |
| 2013/0012338 | A1 * | 1/2013 | Snell | 473/373 |

* cited by examiner

GOLF BALL CORES BASED ON POLYALKENAMER RUBBER HAVING POSITIVE HARDNESS GRADIENTS

CROSS-REFERENCE TO RELATED APPLICATIONS

This application is a continuation-in-part of U.S. patent application Ser. No. 12/047,982, filed Mar. 13, 2008, now abandoned which is a continuation-in-part of U.S. patent application Ser. No. 11/767,070, filed Jun. 22, 2007, now abandoned, which is a continuation-in-part of U.S. patent application Ser. No. 10/773,906, filed Feb. 6, 2004, now U.S. Pat. No. 7,255,656, which is a continuation-in-part of U.S. patent application Ser. No. 10/341,574, filed Jan. 13, 2003, now U.S. Pat. No. 6,852,044, which is a continuation-in-part of U.S. patent application Ser. No. 10/002,641, filed Nov. 28, 2001, now U.S. Pat. No. 6,547,677, the entire disclosures of which are hereby incorporated herein by reference.

BACKGROUND OF THE INVENTION

1. Field of the Invention

The present invention generally relates to golf balls and more particularly to golf balls having single-layer and dual-layer cores. The golf ball includes a cover that may be single or multi-layered. In one version, the single-layer core has a positive hardness gradient. In another version, the dual-layer core has an inner core with a positive hardness gradient and a surrounding outer core layer with a zero, positive, or negative gradient. Preferably, the cores are made of a rubber composition comprising cylcoalkene (polyalkenamer) rubber and more preferably polyoctenamer rubber.

2. Brief Review of the Related Art

Numerous golf balls having a multi-layer construction, wherein the core hardness and cover hardness have been variously improved, are disclosed in the prior art. For example, U.S. Pat. No. 6,987,159 to Iwami discloses a solid golf ball with a solid core and a polyurethane cover, wherein the difference in Shore D hardness between a center portion and a surface portion of the solid core is at least 15, the polyurethane cover has a thickness (t) of not more than 1.0 mm and is formed from a cured urethane composition having a Shore D hardness (D) of from 35 to 60, and a product of t and D ranges from 10 to 45.

U.S. Pat. No. 7,175,542 to Watanabe et al. discloses a multi-piece solid golf ball composed of a multilayer core having at least an inner core layer and an outer core layer, one or more cover layers which enclose the core, and numerous dimples formed on a surface of the cover layer. The golf ball is characterized in that the following hardness conditions are satisfied: (1) (JIS-C hardness of cover)−(JIS-C hardness at center of core)≥27, (2) 23≤(JIS-C hardness at surface of core)−(JIS-C hardness at center of core)≤40, and (3) 0.50≤ [(deflection amount of entire core)/(deflection amount of inner core layer)]≤0.75.

U.S. Pat. No. 6,679,791 to Watanabe discloses a multi-piece golf ball which includes a rubbery elastic core, a cover having a plurality of dimples on the surface thereof, and at least one intermediate layer between the core and the cover. The intermediate layer is composed of a resin material which is harder than the cover. The elastic core has a hardness which gradually increases radially outward from the center to the surface thereof. The center and surface of the elastic core have a hardness difference of at least 18 JIS-C hardness units.

U.S. Pat. No. 5,782,707 to Yamagishi et al. discloses a three-piece solid golf ball consisting of a solid core, an intermediate layer, and a cover, wherein the hardness is measured by a JIS-C scale hardness meter, the core center hardness is up to 75 degrees, the core surface hardness is up to 85 degrees, the core surface hardness is higher than the core center hardness by 8 to 20 degrees, the intermediate layer hardness is higher than the core surface hardness by at least 5 degrees, and the cover hardness is lower than the intermediate layer hardness by at least 5 degrees. Additional examples can be found, for example, in U.S. Pat. No. 6,686,436 to Iwami, U.S. Pat. No. 6,786,836 to Higuchi et al., U.S. Pat. No. 7,153,224 to Higuchi et al., and U.S. Pat. No. 7,226,367 to Higuchi et al.

The golf ball industry is constantly looking to develop compositions that can be used in multi-piece golf balls. For example, Kim et al., U.S. Pat. No. 7,528,196 and U.S. Patent Application Publication US 2009/0191981 disclose a golf ball comprising a core, cover layer, and optionally one or more inner cover layers, wherein at least one portion of the ball comprises a blend of a polyalkenamer and polyamide. The polyalkenamer/polyamide composition contains about 2 to about 90 weight % of a polyalkenamer polymer and about 10 to about 98 weight % of a polyamide. The '196 patent and '981 Published Application further disclose that the polyalkenamer/polyamide composition may be blended with other polymers including polybutadiene, polyisoprene, polychloroprene, polybutylene, and styrene-butadiene rubber prior to molding. However, neither the '196 patent nor '981 Published Application discloses a dual-core having an inner core and surrounding outer core layer, wherein the inner core has a positive hardness gradient, and the outer core layer has a zero; negative; or positive hardness gradient and the inner core and/or outer core is made of a polyalkenamer rubber composition.

In Voorheis et al., U.S. Pat. No. 6,767,940, a golf ball having a core, an intermediate layer, and a cover is disclosed. The core is formed from a composition containing an elastomeric polymer, free-radical initiator, and at least one stable free-radical. The stable free-radical increases the scorch time (time between start of reaction and onset of cross-linking) of the elastomeric polymer. The '940 patent discloses numerous materials that can be used to form the intermediate layer, which is distinguishable from the core, including natural rubbers; balata; gutta-percha; cis-polybutadienes; trans-polybutadienes; synthetic polyisoprenes; polyoctenamers; polypropylene resins; ionomer resins; polyamides; polyesters; urethanes; polyureas; chlorinated polyethylenes; polysulfide rubbers; and fluorocarbons.

In Sullivan et al., U.S. Pat. Nos. 6,783,468, 7,041,009, 7,044,864, 7,118,495, and 7,125,345, a golf ball having a low compression and high coefficient of restitution (COR) layer supported and reinforced by a low deformation layer is disclosed. The preferred polymeric composition for the high COR layer is a base rubber compound, a co-reaction agent, a halogenated organosulfur compound, and a co-cross-linking or initiator agent. The low deformation layer may be made of rigid plastics or polymers reinforced with high strength organic or inorganic fillers or fibers. In one embodiment, the golf ball comprises an innermost core, an outer core, and a cover. The inner core comprises a low deformation material and the outer core comprises a rubber composition. The patents disclose that natural rubbers, including cis-polyisoprene, trans-polyisoprene or balata, synthetic rubbers including 1,2-polybutadiene, cis-polybutadiene, trans-polybutadiene, polychloroprene, poly(norbornene), polyoctenamer and polypentenamer may be used for the outer core. However, there is no disclosure of forming a dual-core, wherein the inner core has a positive hardness gradient and the outer core layer has a zero; negative; or positive hardness gradient, and the inner core and/or outer core is made of a polyalkenamer rubber composition.

In addition, Llort, U.S. Pat. No. 4,792,141 describes a balata-covered golf ball, where up to 40% of the balata used to form the cover has been replaced with polyoctenylene rubber. The golf ball contains a core and a cover wherein the cover is formed from a composition comprising about 97 to about 60 parts balata and about 3 to about 40 parts by weight polyoctenylene rubber based on 100 parts by weight polymer in the composition. The '141 patent discloses that using more than about 40 parts by weight of polyoctenylene produces deleterious effects.

One objective of the present invention is to develop compositions that can be used to make a core for a golf ball, wherein the core provides the ball with high resiliency along with a comfortable and soft "feel." The present invention provides golf ball core compositions having such properties as well as other advantageous characteristics, features, and benefits.

SUMMARY OF THE INVENTION

In a particularly preferred embodiment, the core is made of a rubber composition comprising a cycloalkene (polyalkenamer) rubber, for example, a polyoctenamer, having a trans-content of 55% or greater and a melting point of 30° C. or greater in an amount of at least 50 weight percent. The concentration of cycloalkene rubber is preferably in the range of about 60 to about 100 weight percent based on weight of polymer in the composition. The rubber composition may further include other rubbers such as, for example, polybutadiene, polyisoprene, ethylene propylene rubber, ethylene propylene diene rubber, and styrene-butadiene rubber. The rubber composition helps improve core resiliency and provides the ball with a comfortable and soft feel. The core may have different constructions. In one version, a solid, single core having an outer surface and geometric center is provided, wherein the hardness of the outer surface is greater than the hardness of the geometric center to define a positive hardness gradient of at least 10 Shore C. In a second version, a dual-core having an inner core and surrounding outer core layer is provided. The inner core may be made of a polyalkenamer rubber composition and have a positive hardness gradient. The outer core layer has a second outer surface and an inner surface and also may be made of a polyalkenamer rubber composition. In one example, the hardness of the second outer surface is the same or less than the hardness of the inner surface to define a zero or negative hardness gradient. In another example, the hardness of the second outer surface is greater than the hardness of the inner surface to define a second positive hardness gradient.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Figure 1:
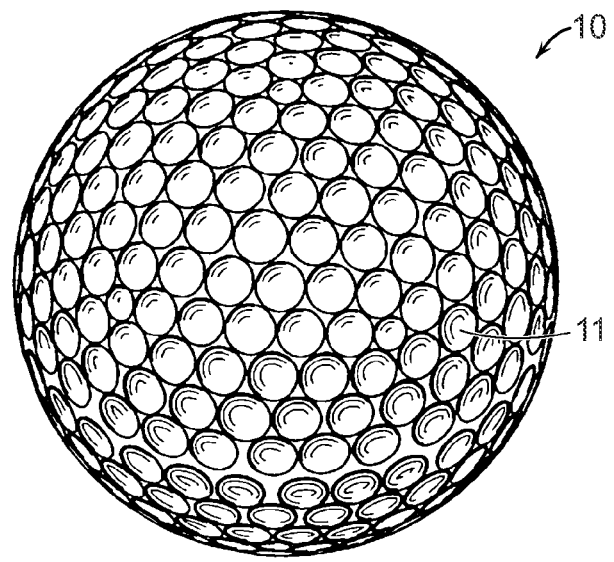
FIG. 1 is a front view of a dimpled golf ball made in accordance with the present invention.

The present invention relates generally to golf balls containing a core made from a rubber composition, wherein the rubber composition comprises a cycloalkene (polyalkenamer) rubber, preferably a polyoctenamer, having a trans-content of 55% or greater and a melting point of 30° C. or greater in an amount of at least 50 weight percent. Golf balls having various constructions may be made in accordance with this invention. For example, golf balls having two-piece, three-piece, four-piece, and five-piece constructions with single or multi-layered cores and cover materials may be made. The term, "layer" as used herein means generally any spherical portion of the golf ball. More particularly, in one version, a three-piece golf ball having a solid center (otherwise referred to as an inner core) and a multi-layered cover (having an inner cover layer and outer cover layer) is made. In another version, a four-piece golf ball comprising a dual-core having an inner core and a surrounding outer core layer and a multi-layered cover is made. In yet another construction, a five-piece golf ball having a dual-core, intermediate layer, and multi-layered cover is made. The diameter and thickness of the different layers along with properties such as hardness and compression may vary depending upon the construction and desired playing performance properties of the golf ball. The core may contain sections having substantially the same hardness or different hardness levels. That is, there can be substantially uniform hardness throughout the different sections or there can be hardness gradients as discussed in further detail below.

In one preferred golf ball, the core is a single-core constituting a solid core having a "positive" hardness gradient (that is, the outer surface of the core is harder than its geometric center.) In a second preferred embodiment, the core is a dual-core comprising an inner core and a surrounding outer core layer. The inner core has a "positive" hardness gradient and the outer core layer has a "negative" hardness gradient (that is, the outer surface of the outer core layer is softer than the inner surface of the outer core layer.) Other embodiments of golf balls having various combinations of positive, negative, and zero hardness gradients may be made in accordance with this invention. For example, the inner core may have a positive hardness gradient and the outer core layer also may have a positive hardness gradient. In another example, the inner core may have a positive hardness gradient and the outer core layer may have a "zero" hardness gradient. (That is, the hardness values of the outer surface of the outer core layer and the inner surface of the outer core layer are substantially the same.) Particularly, the term, "zero hardness gradient" as used herein, means a surface to center Shore C hardness gradient of less than 8, preferably less than 5 and most preferably less than 3 and may have a value of zero or negative 1 to negative 25. The term, "negative hardness gradient" as used herein, means a surface to center Shore C hardness gradient of less than zero. The terms, zero hardness gradient and negative hardness gradient, may be used herein interchangeably to refer to hardness gradients of negative 1 to negative 25. The term, "positive hardness gradient" as used herein, means a surface to center Shore C hardness gradient of 8 or greater, preferably 10 or greater, and most preferably 20 or greater. By the term, "steep positive hardness gradient" as used herein, it is meant surface to center Shore C hardness gradient of 20 or greater, more preferably 25 or greater, and most preferably 30 or greater. For example, the core may have a step positive hardness gradient of 35, 40, or 45 Shore C or greater. Methods for measuring the hardness of the inner core and surrounding layers and determining the hardness gradients are discussed in further detail below.

As mentioned above, in one embodiment, the golf ball has a solid, single-core and a two-layered cover. When a single-layered core is used, the core preferably has a diameter within a range having a lower limit of 1.40 or 1.45 or 1.50 or 1.51 or 1.53 inches and an upper limit of 1.55 or 1.59 or 1.60 or 1.62 or 1.66 inches, and more preferably has a diameter within a range having a lower limit of 1.51 or 1.53 inches and an upper range of 1.55 or 1.59 inches. In a particularly preferred embodiment, the core has a diameter of about 1.53 inches. In a second embodiment, the golf ball has a dual-core (that is, two-layer core) and a two-layered (dual) cover enclosing the core. The dual-core constitutes an inner core (center) and an outer core layer. The inner core has a diameter within a range having a lower limit of 0.75 or 0.85 or 0.875 inches and an upper limit of 1.125 or 1.15 or 1.39 inches. The outer core layer encloses the inner core such that the two-layer core has an overall diameter within a range having a lower limit of 1.40 or 1.50 or 1.51 or 1.52 or 1.525 inches and an upper limit of 1.54 or 1.55 or 1.555 or 1.56 or 1.59 inches.

When a single-layered core is used, the core preferably has a center hardness of 70 Shore C or less, or 65 Shore C or less; or a center hardness within a range having a lower limit of 30 or 40 or 45 Shore C and an upper limit of 70 or 75 or 80 Shore C; or a center hardness of about 60 Shore C. The surface hardness of the core is preferably greater than 70 Shore C, or 75 Shore C or greater, or 80 Shore C or greater, or greater than 80 Shore C, or 85 Shore C or greater, or greater than 85 Shore C, or 87 Shore C or greater, or 90 Shore C or greater. In a particular embodiment, the surface hardness of the core is greater than the center hardness of the core to define a positive hardness gradient and more preferably the surface hardness of the core is at least 10 Shore C units greater than the center hardness of the core. In a particularly preferred embodiment, the core has a steep positive hardness gradient wherein the surface hardness of the core is at least 20 Shore C units greater than the center hardness of the core.

When a dual-layered core is used, the inner core (center) preferably has a geometric center hardness of 50 Shore C or greater, or 55 Shore C or greater, or 60 Shore C or greater, or within a range having a lower limit of 50 or 55 or 60 Shore C and an upper limit of 65 or 70 or 80 Shore C. The inner core preferably has a surface hardness of 65 Shore C or greater, or 70 Shore C or greater, or within a range having a lower limit of 55 or 60 or 65 or 70 Shore C or 75 Shore C and an upper limit of 80 or 85 Shore C. Meanwhile, the outer core layer preferably has an outer surface hardness of 75 Shore C or greater, or 80 Shore C or greater, or 85 Shore C or greater, or 87 Shore C or greater, or 89 Shore C or greater, or 90 Shore C or greater, or within a range having a lower limit of 75 or 80 or 85 Shore C and an upper limit of 90 or 95 Shore C. And, the inner surface of the outer core preferably has a surface hardness of 65 Shore C or greater, or 70 Shore C or greater, or within a range having a lower limit of 55 or 60 or 65 or 70 Shore C or 75 Shore C and an upper limit of 80 or 85 Shore C.

The cores have positive, negative, or zero hardness gradients defined by hardness measurements made at the surface of the inner core (or outer core layer) and radially inward towards the center of the inner core. These measurements are made typically at 2-mm increments as described in the test methods below. In general, the hardness gradient is determined by subtracting the hardness value at the innermost portion of the component being measured (for example, the center of a single core; the center of an inner core in a dual-core construction; the inner surface of the outer core layer in a dual-core construction; and the like) from the hardness value at the outer surface of the component being measured (for example, the outer surface of a single core; the outer surface of an inner core in a dual-core; the outer surface of an outer core layer in a dual-core; and the like.) For example, if the outer surface of a single core has a greater hardness value than its geometric center (that is, the surface is harder than the center), the hardness gradient will be deemed "positive" (a larger number minus a smaller number equals a positive number.) On the other hand, if the outer surface of a single core has a lower hardness value than its geometric center (that is, the center is harder than the surface), the hardness gradient will be deemed "negative" (a smaller number minus a larger number equals a negative number.)

In general, the cores of the golf balls may be formed from a rubber composition or a highly resilient thermoplastic polymer such as a highly neutralized polymer ("HNP") composition. Particularly suitable thermoplastic polymers include Surlyn® ionomers, Hytrel® thermoplastic polyester elastomers, and ionomeric materials sold under the trade names DuPont® HPF 1000 and DuPont® HPF 2000, all of which are commercially available from E.I. du Pont de Nemours and Company; Iotek® ionomers, commercially available from ExxonMobil Chemical Company; and Pebax® thermoplastic polyether block amides, commercially available from Arkema, Inc.

Suitable HNP compositions for use in forming the core comprise an HNP and optionally additives, fillers, and/or melt flow modifiers. Suitable HNPs are salts of homopolymers and copolymers of α,β-ethylenically unsaturated mono- or dicarboxylic acids, and combinations thereof, optionally including a softening monomer. The acid polymer is neutralized to 70% or higher, including up to 100%, with a suitable cation source. Suitable additives and fillers include, for example, blowing and foaming agents, optical brighteners, coloring agents, fluorescent agents, whitening agents, UV absorbers, light stabilizers, defoaming agents, processing aids, mica, talc, nanofillers, antioxidants, stabilizers, softening agents, fragrance components, plasticizers, impact modifiers, acid copolymer wax, surfactants; inorganic fillers, such as zinc oxide, titanium dioxide, tin oxide, calcium oxide, magnesium oxide, barium sulfate, zinc sulfate, calcium carbonate, zinc carbonate, barium carbonate, mica, talc, clay, silica, lead silicate, and the like; high specific gravity metal powder fillers, such as tungsten powder, molybdenum powder, and the like; regrind, i.e., core material that is ground and recycled; and nano-fillers. Suitable melt flow modifiers include, for example, fatty acids and salts thereof, polyamides, polyesters, polyacrylates, polyurethanes, polyethers, polyureas, polyhydric alcohols, and combinations thereof. Suitable HNP compositions also include blends of HNPs with partially neutralized ionomers as disclosed, for example, in U.S. Patent Application Publication No. 2006/0128904, the entire disclosure of which is hereby incorporated herein by reference, and blends of HNPs with additional thermoplastic and thermoset materials, including, but not limited to, ionomers, acid copolymers, engineering thermoplastics, fatty acid/salt-based highly neutralized polymers, polybutadienes, polyurethanes, polyesters, thermoplastic elastomers, and other conventional polymeric materials. Particularly suitable as a core layer material is DuPont® HPF 1000, commercially available from E.I. du Pont de Nemours and Company. Suitable HNP compositions are further disclosed, for example, in U.S. Pat. Nos. 6,653,382, 6,756,436, 6,777,472, 6,894,098, 6,919,393, and 6,953,820, the entire disclosures of which are hereby incorporated herein by reference.

Suitable rubber compositions for use in forming the core comprise a base rubber, a cross-linking agent, a filler, and a co-cross-linking or initiator agent. Typical base rubber materials include natural and synthetic rubbers, and combinations of two or more thereof. The base rubber is preferably polybutadiene or a mixture of polybutadiene with other elastomers. Particularly preferred is 1,4-polybutadiene having a cis-structure of at least 40%. More preferably, the base rubber is a high-Mooney-viscosity rubber. Lesser amounts of other thermoset materials may be incorporated into the base rubber. Such materials include, for example, cis-polyisoprene, trans-polyisoprene, balata, polychloroprene, polynorbornene, polyoctenamer, polypentenamer, butyl rubber, EPR, EPDM, styrene-butadiene, and similar thermoset materials. The cross-linking agent typically includes a metal salt, such as a zinc-, aluminum-, sodium-, lithium-, nickel-, calcium-, or magnesium-salt, of an unsaturated fatty acid or monocarboxylic acid, such as (meth)acrylic acid. Preferred cross-linking agents include zinc acrylate, zinc diacrylate (ZDA), zinc methacrylate, and zinc dimethacrylate (ZDMA), and mixtures thereof. The cross-linking agent must be present in an amount sufficient to crosslink a portion of the chains of the polymers in the resilient polymer component. The cross-linking agent is generally present in the rubber composition in an amount of from 15 to 30 phr, or from 19 to 25 phr, or from 20 to 24 phr. The desired compression may be obtained by adjusting the amount of cross-linking, which can be achieved, for example, by altering the type and amount of cross-linking agent. The initiator agent can be any known polymerization initiator which decomposes during the cure cycle, including, but not limited to, dicumyl peroxide, 1,1-di-(t-butylperoxy) 3,3,5-trimethyl cyclohexane, a-a bis-(t-butylperoxy)diisopropylbenzene, 2,5-di-(t-butylperoxy)-2,5-dimethyl hexane, di-t-butyl peroxide, n-butyl-4,4-bis(t-butylperoxy)valerate, lauryl peroxide, benzoyl peroxide, t-butyl hydroperoxide, and mixtures thereof.

The rubber composition optionally contains one or more antioxidants. Antioxidants are compounds that can inhibit or prevent the oxidative degradation of the rubber. Some antioxidants also act as free radical scavengers; thus, when antioxidants are included in the rubber composition, the amount of initiator agent used may be as high or higher than the amounts disclosed herein. Suitable antioxidants include, for example, dihydroquinoline antioxidants, amine type antioxidants, and phenolic type antioxidants.

The rubber composition may also contain one or more fillers to adjust the density and/or specific gravity of the core or cover. Fillers are typically polymeric or mineral particles. Exemplary fillers include precipitated hydrated silica, clay, talc, asbestos, glass fibers, aramid fibers, mica, calcium metasilicate, zinc sulfate, barium sulfate, zinc sulfide, lithopone, silicates, silicon carbide, diatomaceous earth, polyvinyl chloride, carbonates (e.g., calcium carbonate, zinc carbonate, barium carbonate, and magnesium carbonate), metals (e.g., titanium, tungsten, aluminum, bismuth, nickel, molybdenum, iron, lead, copper, boron, cobalt, beryllium, zinc, and tin), metal alloys (e.g., steel, brass, bronze, boron carbide whiskers, and tungsten carbide whiskers), oxides (e.g., zinc oxide, tin oxide, iron oxide, calcium oxide, aluminum oxide, titanium dioxide, magnesium oxide, and zirconium oxide), particulate carbonaceous materials (e.g., graphite, carbon black, cotton flock, natural bitumen, cellulose flock, and leather fiber), microballoons (e.g., glass and ceramic), fly ash, regrind (i.e., core material that is ground and recycled), nanofillers and combinations thereof. The amount of particulate material(s) present in the rubber composition is typically within a range having a lower limit of 5 parts or 10 parts by weight per 100 parts of the base rubber, and an upper limit of 30 parts or 50 parts or 100 parts by weight per 100 parts of the base rubber. Filler materials may be dual-functional fillers, such as zinc oxide (which may be used as a filler/acid scavenger) and titanium dioxide (which may be used as a filler/brightener material). Further examples of suitable fillers and additives include, but are not limited to, those disclosed in U.S. Pat. No. 7,041,721, the entire disclosure of which is hereby incorporated herein by reference.

The rubber composition may also contain one or more additives selected from processing aids, processing oils, plasticizers, coloring agents, fluorescent agents, chemical blowing and foaming agents, defoaming agents, stabilizers, softening agents, impact modifiers, free radical scavengers, accelerators, scorch retarders, and the like. The amount of additive(s) typically present in the rubber composition is typically within a range having a lower limit of 0 parts by weight per 100 parts of the base rubber, and an upper limit of 20 parts or 50 parts or 100 parts or 150 parts by weight per 100 parts of the base rubber.

The rubber composition optionally includes a soft and fast agent. As used herein, "soft and fast agent" means any compound or a blend thereof that is capable of making a core 1) softer (have a lower compression) at a constant "coefficient of restitution" (COR) and/or 2) faster (have a higher COR at equal compression), when compared to a core equivalently prepared without a soft and fast agent. Preferably, the rubber composition contains from 0.05 phr to 10.0 phr of a soft and fast agent. In one embodiment, the soft and fast agent is present in an amount of from 0.05 phr to 3.0 phr, or from 0.05 phr to 2.0 phr, or from 0.05 phr to 1.0 phr. In another embodiment, the soft and fast agent is present in an amount of from 2.0 phr to 5.0 phr, or from 2.35 phr to 4.0 phr, or from 2.35 phr to 3.0 phr. In an alternative high concentration embodiment, the soft and fast agent is present in an amount of from 5.0 phr to 10.0 phr, or from 6.0 phr to 9.0 phr, or from 7.0 phr to 8.0 phr. In another embodiment, the soft and fast agent is present in an amount of 2.6 phr.

Suitable soft and fast agents include, but are not limited to, organosulfur or metal-containing organosulfur compounds, an organic sulfur compound, including mono, di, and polysulfides, a thiol, or mercapto compound, an inorganic sulfide compound, a Group VIA compound, a substituted or unsubstituted aromatic organic compound that does not contain sulfur or metal, an aromatic organometallic compound, or mixtures thereof. The soft and fast agent component may also be a blend of an organosulfur compound and an inorganic sulfide compound. Other suitable soft and fast agents include, but are not limited to, hydroquinones, benzoquinones, quinhydrones, catechols, and resorcinols.

Preferably, the halogenated thiophenol compound is pentachlorothiophenol, which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, Ohio. PCTP is commercially available in neat form from eChinachem of San Francisco, Calif. and in the salt form from eChinachem of San Francisco, Calif. Most preferably, the halogenated thiophenol compound is the zinc salt of pentachlorothiophenol, which is commercially available from eChinachem of San Francisco, Calif. Additional examples are disclosed in U.S. Pat. No. 7,148,279, the entire disclosure of which is hereby incorporated herein by reference.

Examples of commercially available polybutadienes suitable for use in forming the core include, but are not limited to, BUNA CB 23, commercially available from Lanxess Corp; SE BR-1220, commercially available from The Dow Chemical Company; Europrene® NEOCIS® BR 40 and BR 60, commercially available from Polimeri Europa; UBEPOL-BR® rubbers, commercially available from UBE Industries, Ltd.; and BR 01 commercially available from Japan Synthetic Rubber Co., Ltd.

Suitable types and amounts of base rubber, cross-linking agent, filler, co-cross-linking agent, initiator agent and additives are more fully described in, for example, U.S. Pat. Nos. 7,138,460; 7,041,721; 6,939,907; 6,695,718; 6,566,483; and 6,939,907, the entire disclosures of which are hereby incorporated herein by reference.

The core may also comprise thermosetting or thermoplastic materials such as polyurethane, polyurea, partially or fully neutralized ionomers, thermosetting polydiene rubber such as polybutadiene, polyisoprene, ethylene propylene diene monomer rubber, ethylene propylene rubber, natural rubber, balata, butyl rubber, halobutyl rubber, styrene butadiene rubber or any styrenic block copolymer such as styrene ethylene butadiene styrene rubber, etc., metallocene or other single site catalyzed polyolefin, polyurethane copolymers, e.g., with silicone, as long as the material meets the desired coefficient of restitution ("COR").

Additional materials suitable for forming the core include the core compositions disclosed in U.S. Pat. No. 7,300,364, the entire disclosure of which is hereby incorporated herein by reference. For example, suitable core materials include HNPs neutralized with organic fatty acids and salts thereof, metal cations, or a combination of both. In addition to HNPs neutralized with organic fatty acids and salts thereof, core compositions may comprise at least one rubber material having a resilience index of at least about 40. Preferably the resilience index is at least about 50. Polymers that produce resilient golf balls and, therefore, are suitable for the present invention, include but are not limited to CB23, CB22, commercially available from of Bayer Corp. of Orange, Tex., BR60, commercially available from Enichem of Italy, and 1207G, commercially available from Goodyear Corp. of Akron, Ohio. Additionally, the unvulcanized rubber, such as polybutadiene, in golf balls prepared according to the invention typically has a Mooney viscosity of between about 40 and about 80, more preferably, between about 45 and about 65, and most preferably, between about 45 and about 55. Mooney viscosity is typically measured according to ASTM-1646.

In one embodiment, the core is enclosed with a cover comprising an inner cover layer and an outer cover layer and the surface hardness of the core is greater than the material hardness of the inner cover layer. In a particular embodiment, the surface hardness of the core is greater than both the inner cover layer and the outer cover layer.

The cured polybutadiene-based compositions typically have a hardness of 15 Shore A or greater, and preferably have a hardness of from 30 Shore A to 80 Shore D, more preferably from 50 Shore A to 60 Shore D. The inner cover layer preferably has a material hardness of 90 Shore C or less, or 85 Shore C or less, or a material hardness of from 80 Shore C to 90 Shore C, or a material hardness within a range having a lower limit of 70 or 75 or 80 or 82 Shore C and an upper limit of 85 or 86 or 90 Shore C. The thickness of the inner cover layer is preferably within a range having a lower limit of 0.010 or 0.015 or 0.020 or 0.030 inches and an upper limit of 0.035 or 0.045 or 0.080 or 0.120 inches. The outer cover layer preferably has a material hardness of 85 Shore C or less. The thickness of the outer cover layer is preferably within a range having a lower limit of 0.010 or 0.015 or 0.025 inches and an upper limit of 0.035 or 0.040 or 0.055 or 0.080 inches. Methods for measuring hardness of the layers in the golf ball are described in further detail below.

Suitable materials for forming the inner and outer cover layer include ionomer resins and blends thereof (particularly Surlyn® ionomer resins), polyurethanes, polyureas, (meth)acrylic acid, thermoplastic rubber polymers, polyethylene, and synthetic or natural vulcanized rubber, such as balata. Suitable commercially available ionomeric cover materials include, but are not limited to, Surlyn® ionomer resins and DuPont® HPF 1000 and HPF 2000, commercially available from E.I. du Pont de Nemours and Company; and Iotek® ionomers, commercially available from ExxonMobil Chemical Company.

Also suitable for forming cover layers are blends of ionomers with thermoplastic elastomers. Suitable ionomeric cover materials are further disclosed, for example, in U.S. Pat. Nos. 6,653,382, 6,756,436, 6,894,098, 6,919,393, and 6,953,820, the entire disclosures of which are hereby incorporated by reference. Suitable polyurethane cover materials are further disclosed in U.S. Pat. Nos. 5,334,673, 6,506,851, and 6,756,436, the entire disclosures of which are hereby incorporated herein by reference. Suitable polyurea cover materials are further disclosed in U.S. Pat. Nos. 5,484,870 and 6,835,794, the entire disclosures of which are hereby incorporated herein by reference. Suitable polyurethanes, polyureas, and polyurethane-urea hybrids, which are blends or copolymers comprising urethane and urea segments, as disclosed in U.S. Pat. Nos. 6,476,176; 6,958,379; 6,960,630; 6,964,621; 7,041,769; 7,105,623; 7,131,915; and 7,186,777, the entire disclosure of which is hereby incorporated herein by reference, also may be used. Additional suitable cover materials are disclosed, for example, in U.S. Pat. Nos. 7,182,702 and 5,919,100, the entire disclosures of which are hereby incorporated herein by reference.

The inner cover layer is preferably formed from a composition comprising an ionomer or a blend of two or more ionomers. In a particular embodiment, the inner cover layer is formed from a composition comprising a high acid ionomer. For purposes of the present disclosure, "high acid ionomer" includes ionomers having an acid content of greater than 16 wt %. A particularly suitable high acid ionomer is Surlyn 8150®, commercially available from E.I. du Pont de Nemours and Company. Surlyn 8150® is a copolymer of ethylene and methacrylic acid, having an acid content of 19 wt %, which is 45% neutralized with sodium. In another particular embodiment, the inner cover layer is formed from a composition comprising a high acid ionomer and a maleic anhydride-grafted non-ionomeric polymer. A particularly suitable maleic anhydride-grafted polymer is Fusabond 572D®, commercially available from E.I. du Pont de Nemours and Company. Fusabond 572D® is a maleic anhydride-grafted, metallocene-catalyzed ethylene-butene copolymer having about 0.9 wt % maleic anhydride grafted onto the copolymer. A particularly preferred blend of high acid ionomer and maleic anhydride-grafted polymer is a 84 wt %/16 wt % blend of Surlyn 8150® and Fusabond 572D®. Blends of high acid ionomers with maleic anhydride-grafted polymers are further disclosed, for example, in U.S. Pat. Nos. 6,992,135 and 6,677,401, the entire disclosures of which are hereby incorporated herein by reference.

In another particular embodiment, the inner cover layer is preferably formed from a composition comprising a 50/45/5 blend of Surlyn® 8940/Surlyn® 9650/Nucrel® 960, and, in a particularly preferred embodiment, has a material hardness of from 80 to 85 Shore C. In another particular embodiment, the inner cover layer is preferably formed from a composition comprising a 50/25/25 blend of Surlyn® 8940/Surlyn® 9650/Surlyn® 9910, preferably having a material hardness of about 90 Shore C. In yet another particular embodiment, the inner cover layer is preferably formed from a composition comprising a 50/50 blend of Surlyn® 8940/Surlyn® 9650, preferably having a material hardness of about 86 Shore C. Surlyn® 8940 is an E/MAA copolymer in which the MAA acid groups have been partially neutralized with sodium ions. Surlyn® 9650 and Surlyn® 9910 are two different grades of E/MAA copolymer in which the MAA acid groups have been partially neutralized with zinc ions. Nucrel® 960 is an E/MAA copolymer resin nominally made with 15 wt % methacrylic acid. Surlyn® 8940, Surlyn® 9650, Surlyn® 9910, and Nucrel® 960 are commercially available from E.I. du Pont de Nemours and Company. Non-limiting examples of preferred inner cover layer materials are shown in the Examples below.

Ionomeric compositions of the present invention can be blended with non-ionic thermoplastic resins, particularly to manipulate product properties. Examples of suitable non-ionic thermoplastic resins include, but are not limited to, polyurethane, poly-ether-ester, poly-amide-ether, polyether-urea, Pebax® thermoplastic polyether block amides commercially available from Arkema Inc., styrene-butadiene-styrene block copolymers, styrene(ethylene-butylene)-styrene block copolymers, polyamides, polyesters, polyolefins (e.g., polyethylene, polypropylene, ethylene-propylene copolymers, ethylene-(meth)acrylate, ethylene-(meth)acrylic acid, functionalized polymers with maleic anhydride grafting, Fusabond® functionalized olefins commercially available from E.I. du Pont de Nemours and Company, functionalized polymers with epoxidation, elastomers (e.g., EPDM, metallocene-catalyzed polyethylene) and ground powders of the thermoset elastomers. The inner cover layer material may include a flow modifier, such as, but not limited to, Nucrel® acid copolymer resins, and particularly Nucrel® 960. Nucrel® acid copolymer resins are commercially available from E.I. du Pont de Nemours and Company. The outer cover layer is preferably formed from a composition comprising polyurethane; polyurea; or a blend, copolymer, or hybrid of polyurethane/polyurea. The outer cover layer material may be thermoplastic or thermoset. Basically, polyurethane compositions contain urethane linkages formed by reacting an isocyanate group (—N═C═O) with a hydroxyl group (OH). Polyurethanes are produced by the reaction of a multi-functional isocyanate with a polyol in the presence of a catalyst and other additives. The chain length of the polyurethane prepolymer is extended by reacting it with a hydroxyl-terminated curing agent. Polyurea compositions, which are distinct from the above-described polyurethanes, also can be formed. In general, polyurea compositions contain urea linkages formed by reacting an isocyanate group (—N═C═O) with an amine group (NH or $NH_2$). The chain length of the polyurea prepolymer is extended by reacting the prepolymer with an amine curing agent. Hybrid compositions containing urethane and urea linkages also may be produced. For example, a polyurethane/urea hybrid composition may be produced when a polyurethane prepolymer is reacted with an amine-terminated curing agent. The term, "hybrid polyurethane-polyureas" is also meant to encompass blends and copolymers of polyurethanes and polyureas.

In a particularly preferred embodiment, the present invention provides a golf ball consisting of: a single-layer core, an inner cover layer, and an outer cover layer. The core is preferably formed from a rubber composition and, in a particularly preferred embodiment, has one or more of the following properties: a diameter of about 1.53 inches, a compression of about 70, a center hardness of about 60 Shore C, and a surface hardness of about 85 Shore C. The rubber composition preferably has the following formulation: 100 parts high-cis butadiene rubber, 30 phr zinc diacrylate, 5 phr zinc oxide, $BaSO_4$ in amount necessary to achieve the desired specific gravity, 0.5 phr zinc pentachlorothiophenol, 1.2 phr Perkadox BC, and from 10 to 20 phr regrind material. The inner cover layer is preferably formed from a composition comprising a 84 wt %/16 wt % blend of Surlyn 8150® and Fusabond 572D®. The outer cover layer is preferably formed from a polyurethane or polyurea composition.

A moisture vapor barrier layer is optionally employed between the core and the cover. Moisture vapor barrier layers are further disclosed, for example, in U.S. Pat. Nos. 6,632,147, 6,932,720, 7,004,854, and 7,182,702, the entire disclosures of which are hereby incorporated herein by reference.

In addition to the materials disclosed above, any of the core or cover layers may comprise one or more of the following materials: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyester-amides, polyether-amides, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, metallocene-catalyzed polymers, styrene-acrylonitrile (SAN), olefin-modified SAN, acrylonitrile-styrene-acrylonitrile, styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene rubber (EPDM), ethylene-vinyl acetate copolymer (EVA), ethylene propylene rubber (EPR), ethylene vinyl acetate, polyurea, and polysiloxane. Suitable polyamides for use as an additional material in compositions disclosed herein also include resins obtained by: (1) polycondensation of (a) a dicarboxylic acid, such as oxalic acid, adipic acid, sebacic acid, terephthalic acid, isophthalic acid or 1,4-cyclohexanedicarboxylic acid, with (b) a diamine, such as ethylenediamine, tetramethylenediamine, pentamethylenediamine, hexamethylenediamine, or decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; or (4) copolymerization of a cyclic lactam with a dicarboxylic acid and a diamine. Specific examples of suitable polyamides include Nylon 6, Nylon 66, Nylon 610, Nylon 11, Nylon 12, copolymerized Nylon, Nylon MXD6, and Nylon 46.

Other preferred materials suitable for use as an additional material in golf ball compositions disclosed herein include Skypel polyester elastomers, commercially available from SK Chemicals of South Korea; Septon® diblock and triblock copolymers, commercially available from Kuraray Corporation of Kurashiki, Japan; and Kraton® diblock and triblock copolymers, commercially available from Kraton Polymers LLC of Houston, Tex.

Ionomers are also well suited for blending with compositions disclosed herein. Suitable ionomeric polymers include α-olefin/unsaturated carboxylic acid copolymer- or terpolymer-type ionomeric resins. Copolymeric ionomers are obtained by neutralizing at least a portion of the carboxylic groups in a copolymer of an α-olefin and an α,β-unsaturated carboxylic acid having from 3 to 8 carbon atoms, with a metal ion. Terpolymeric ionomers are obtained by neutralizing at least a portion of the carboxylic groups in a terpolymer of an α-olefin, an α,β-unsaturated carboxylic acid having from 3 to 8 carbon atoms, and an α,β-unsaturated carboxylate having from 2 to 22 carbon atoms, with a metal ion. Examples of suitable α-olefins for copolymeric and terpolymeric ionomers include ethylene, propylene, 1-butene, and 1-hexene. Examples of suitable unsaturated carboxylic acids for copolymeric and terpolymeric ionomers include acrylic, methacrylic, ethacrylic, α-chloroacrylic, crotonic, maleic, fumaric, and itaconic acid. Copolymeric and terpolymeric ionomers include ionomers having varied acid contents and degrees of acid neutralization, neutralized by monovalent or bivalent cations as disclosed herein. Examples of commercially available ionomers suitable for blending with compositions disclosed herein include Surlyn® ionomer resins, commercially available from E.I. du Pont de Nemours and Company, and Iotek® ionomers, commercially available from ExxonMobil Chemical Company.

Silicone materials are also well suited for blending with compositions disclosed herein. Suitable silicone materials include monomers, oligomers, prepolymers, and polymers, with or without adding reinforcing filler. One type of silicone material that is suitable can incorporate at least 1 alkenyl group having at least 2 carbon atoms in their molecules. Examples of these alkenyl groups include, but are not limited to, vinyl, allyl, butenyl, pentenyl, hexenyl, and decenyl. The alkenyl functionality can be located at any location of the silicone structure, including one or both terminals of the structure. The remaining (i.e., non-alkenyl) silicon-bonded organic groups in this component are independently selected from hydrocarbon or halogenated hydrocarbon groups that contain no aliphatic unsaturation. Non-limiting examples of these include: alkyl groups, such as methyl, ethyl, propyl, butyl, pentyl, and hexyl; cycloalkyl groups, such as cyclohexyl and cycloheptyl; aryl groups, such as phenyl, tolyl, and xylyl; aralkyl groups, such as benzyl and phenethyl; and halogenated alkyl groups, such as 3,3,3-trifluoropropyl and chloromethyl. Another type of suitable silicone material is one having hydrocarbon groups that lack aliphatic unsaturation. Specific examples include: trimethylsiloxy-endblocked dimethylsiloxane-methylhexenylsiloxane copolymers; dimethylhexenylsiloxy-endblocked dimethylsiloxane-methylhexenylsiloxane copolymers; trimethylsiloxy-endblocked dimethylsiloxane-methylvinylsiloxane copolymers; trimethylsiloxyl-endblocked methylphenylsiloxane-dimethylsiloxane-methylvinysiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and the copolymers listed above wherein at least one group is dimethylhydroxysiloxy. Examples of commercially available silicones suitable for blending with compositions disclosed herein include Silastic® silicone rubber, commercially available from Dow Corning Corporation of Midland, Mich.; Blensil® silicone rubber, commercially available from General Electric Company of Waterford, N.Y.; and Elastosil® silicones, commercially available from Wacker Chemie AG of Germany.

Other types of copolymers can also be added to the golf ball compositions disclosed herein. For example, suitable copolymers comprising epoxy monomers include styrene-butadiene-styrene block copolymers in which the polybutadiene block contains an epoxy group, and styrene-isoprene-styrene block copolymers in which the polyisoprene block contains epoxy. Examples of commercially available epoxy functionalized copolymers include ESBS A1005, ESBS A1010, ESBS A1020, ESBS AT018, and ESBS AT019 epoxidized styrene-butadiene-styrene block copolymers, commercially available from Daicel Chemical Industries, Ltd. of Japan.

The present invention is not limited by any particular process for forming the golf ball layer(s). It should be understood that the layer(s) can be formed by any suitable technique, including injection molding, compression molding, casting, and reaction injection molding. Coefficient of Restitution ("COR") and Compression are important properties of the golf balls of this invention as discussed further below. The golf balls typically have a COR of 0.70 or greater, preferably 0.75 or greater, and more preferably 0.78 or greater and a Compression of 40 or greater, or a Compression within a range having a lower limit of 50 or 60 and an upper limit of 100 or 120, preferably 90 to 100. Methods for measuring COR and Compression are described in the test methods below.

In one embodiment of a dual-core golf ball, the inner core layer preferably has a compression of 20 or less. The cores of the present invention preferably have an overall compression within a range having a lower limit of 40 or 50 or 60 or 65 or 70 or 75 and an upper limit of 80 or 85 or 90 or 100 or 110 or 120, or an overall compression of about 90. In addition, the golf balls typically will have dimple coverage of 60% or greater, preferably 65% or greater, and more preferably 75% or greater. Furthermore, the golf balls preferably have a Moment of Inertia ("MOI") of 70-95 $g \cdot cm^2$, preferably 75-93 $g \cdot cm^2$, and more preferably 76-90 $g \cdot cm^2$. For low MOI embodiments, the golf ball preferably has an MOI of 85 $g \cdot cm^2$ or less, or 83 $g \cdot cm^2$ or less. For high MOI embodiments, the golf ball preferably has an MOI of 86 $g \cdot cm^2$ or greater, or 87 $g \cdot cm^2$ or greater. Methods for measuring MOI are described in further detail below.

The United States Golf Association specifications limit the minimum size of a competition golf ball to 1.680 inches. There is no specification as to the maximum diameter, and golf balls of any size can be used for recreational play. Golf balls of the present invention can have an overall diameter of any size. The preferred diameter of the present golf balls is from 1.680 inches to 1.800 inches. More preferably, the present golf balls have an overall diameter of from 1.680 inches to 1.760 inches, and even more preferably from 1.680 inches to 1.740 inches.

The resiliency and rebounding performance of the golf ball is based primarily on the core of the ball. The core acts as the "engine" for the ball. In general, the rebounding performance of the ball is based on its initial velocity after being struck by the face of the golf club and its outgoing velocity after making impact with a hard surface. More particularly, the "coefficient of restitution" or "COR" of a golf ball refers to the ratio of a ball's rebound velocity to its initial incoming velocity when the ball is fired out of an air cannon into a rigid vertical plate. The COR for a golf ball is written as a decimal value between zero and one. A golf ball may have different COR values at different initial velocities. The United States Golf Association (USGA) sets limits on the initial velocity of the ball so one objective of golf ball manufacturers is to maximize the COR under these conditions. Balls with a higher rebound velocity have a higher COR value. Such golf balls rebound faster, retain more total energy when struck with a club, and have longer flight distance. In general, the COR of the ball will increase as the hardness of the ball is increased. The harder core imparts a higher initial velocity to the ball and results in the golf ball traveling a greater distance. These harder balls, however, tend to provide the player with a rougher and less natural "feel" when he/she strikes the ball with the club face. The player senses less control over the hard ball as the club face makes impact with the ball. The sensation experienced when hitting such hard balls tends to be harsh and the playability of such hard balls can be difficult. Developing a rubber composition that can be used to improve the resiliency of the core while at the same time providing the ball with a comfortable and soft "feel" is desirable for the golf ball industry and the present invention provides such compositions.

In accordance with the present invention, it now has been found that rubber compositions comprising "cycloalkene rubber" can be used to provide a golf ball having improved resiliency and rebounding properties along with a soft feel. Cycloalkene rubbers are rubbery polymers made from one or more cycloalkenes having from 5 to 20, preferably 5 to 15, ring carbon atoms. The cycloalkene rubbers (also referred to as polyalkenylene or polyalkenamer rubbers) may be prepared by ring opening metathesis polymerization of one or more cycloalkenes in the presence of organometallic catalysts as is known in the art. Such polymerization methods are disclosed, for example, in U.S. Pat. Nos. 3,492,245 and 3,804,803, the disclosures of which are hereby incorporated by reference. By the term, "cycloalkene rubber" as used herein, it is meant a compound having at least 20 weight % macrocycles (cyclic content). The cyclic and linear portions of the cycloalkene rubber have the following general chemical structures:

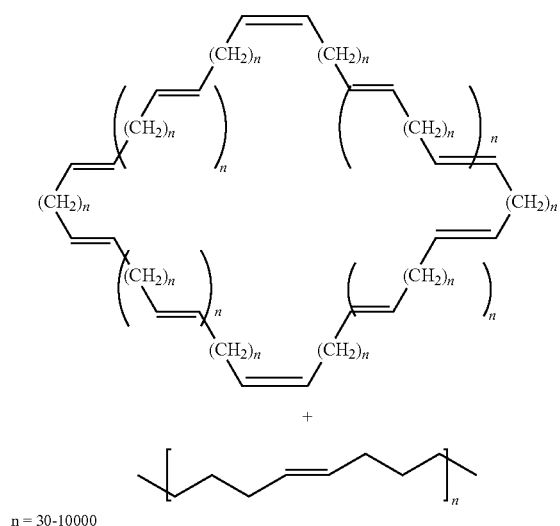

n = 30-10000

Suitable cyclic olefins that can be used to make the cycloalkene rubber include unsaturated hydrocarbons with 4 to 12 ring carbon atoms in one or more rings e.g., 1-3 rings, which exhibit in at least one ring an unsubstituted double bond which is not in conjugation to a second double bond which may be present and which may have any degree of substitution; the substituents must not interfere with the metathesis catalysts and are preferably alkyl groups of 1 to 4 carbon atoms or a part of a cyclic structure of 4 to 8 carbon atoms. Examples are cyclobutene, cyclopentene, cycloheptene, cis- and trans-cyclooctene, cyclononene, cyclodecene, cycloundecene, cis- and trans-cyclododecene, cis, cis-cyclooctadiene, 1-methyl-1,5-cyclooctadiene, 3-methyl-1,5-cyclooctadiene, and 3,7-dimethyl-1,5-cyclooctadiene.

Examples of suitable polyalkenamer rubbers are polypentenamer rubber, polyheptenamer rubber, polyoctenamer rubber, polydecenamer rubber and polydodecenamer rubber. Polyoctenamer rubbers are commercially available from Evonik Degussa GmbH of Marl, Germany and sold under the VESTENAMER tradename. The polyalkenamer rubber used in the present invention preferably has a trans-bond content of about 55% or greater and a second heat melting point of about 30° C. or greater. More preferably, the cycloalkene rubber has a trans-bond content of 75% or greater and a second heat melting point of 50° C. or greater. Furthermore, the polyalkenamer rubber material preferably has a molecular weight of about 80,000 or greater (measured according to GPC); a glass transition temperature (Tg) of about 55° C. or less (measured according to ISO 6721 or 4663); a cis-to-trans ratio of double bonds of about 40:60 or preferably about 20:80 (measured according to IR); a Mooney viscosity ML (1+4) 100° C. of less than about 10 (measured according to DIN 53 523 or ASTM-D 1646); a viscosity number J/23° C. of about 130 or preferably about 120 ml/g (measured according to ISO 1628-1); and a density of about 0.9 g/cm$^3$ or greater (measured according to DIN 53 479 A or ISO 1183).

The polyalkenamer rubber compound, of and by itself, has relatively high crystallinity. For example, a specific grade of polyalkenamer rubber (VESTENAMER 8012) has a crystallinity of approximately 30% (measured by DSC, second melting.) The ratio of cis double bonds to trans double bonds (cis/trans ratio) in the polymer is significant in determining the degree of crystallinity in the polymer. In general, if the trans-bond content of the polymer is relatively high, the crystallinity and melting point of the polymer is relatively high. That is, as the trans-bond content increases, the crystallinity of the polymer increases. The polyalkenamer rubber, VESTENAMER 8012 has a trans-bond content of about 80%. In accordance with the present invention, it has been found the compression of polyalkenamer rubber cores is reduced and the Coefficient of Restitution ("COR") of the cores is increased when the rubber composition is cross-linked to a relatively high degree and the composition does not contain a reactive cross-linking co-agent such as zinc diacrylate (ZDA). The polyalkenamer rubber composition may be cured using a conventional curing process such as peroxide-curing, sulfur-curing, and high-energy radiation, and combinations thereof. For example, the composition may be peroxide-cured. When peroxide is added at relatively high amounts (particularly, at least 2.5 and preferably 5.0 phr) and the composition (which if it does not contain a reactive cross-linking co-agent such as ZDA) is cured to cross-link the rubber chains, then the compression of the polyalkenamer rubber cores is reduced and the COR of the cores is increased. It is believed this phenomenon is due, at least in part, to disrupting the crystalline structure of the polymer by curing and cross-linking the composition in accordance with this invention. While not wishing to be bound by any theory, it is believed the cross-linking causes the tightly packed structures within the mass of polyalkenamer polymer to spread out, thus disrupting the crystallinity of the material. It appears the crystallinity may be partially disrupted and the polymer remains in a partially crystalline state. As a result, the polyalkenamer rubber (which if it does not contain a reactive cross-linking agent such as ZDA) becomes softer and more rubbery and the compression of core samples made from the composition decreases.

One example of a commercially-available material that can be used in accordance with this invention is VESTENAMER 8012 (trans-bond content of about 80% and a melting point of about 54° C.). The material, VESTENAMER 6213 (trans-bond content of about 60% and a melting point of about 30°) also may be effective.

In the present invention, it has been found that rubber compositions comprising polyoctenamer rubber are particularly effective. Polyoctenamer rubber compositions can be used to make a core that provides the golf ball with good rebounding properties (distance) without sacrificing a nice feel to the ball. The resulting ball has a relatively high COR allowing it to reach a high velocity when struck by a golf club. Thus, the ball tends to travel a greater distance which is particularly important for driver shots off the tee. Meanwhile, the soft feel of the ball provides the player with a more pleasant sensation when he/she strikes the ball with the club. The player senses more control over the ball as the club face makes impact. Furthermore, the soft feel of the ball's cover allows players to place a spin on the ball and better control its flight pattern which is particularly important for approach shots near the green.

The polyalkenamer rubber is used in an amount of at least 50% by weight based on total amount of polymer in the rubber composition used to make the core. Preferably, the polyalkenamer rubber is present in an amount of 65 to 100% by weight and more preferably 75 to 100% by weight based on total polymer weight. It is believed that when the concentration of the polyalkenamer rubber is less than 50% by weight, the resiliency of the rubber composition is not significantly improved. In particular versions, the blend may contain a lower concentration of polylakenamer rubber in the amount of 50%, 55%, 60%, 65%, or 70% and an upper concentration of polyalkenamer in the amount of 75%, 80%, 85%, 90%, or 95%.

The polyalkenamer rubber may be blended with other rubber and polymeric materials. As described above, these rubber materials include, but are not limited to, polybutadiene, polyisoprene, ethylene propylene rubber ("EPR"), ethylene propylene diene rubber ("EPDM"), styrene-butadiene rubber, styrenic block copolymer rubbers (such as SI, SIS, SB, SBS, SIBS, SEBS, and the like, where "S" is styrene, "I" is isobutylene, "B" is butadiene, and "E" is ethylene), butyl rubber, halobutyl rubber, polystyrene elastomers, polyethylene elastomers, polyurethane elastomers, polyurea elastomers, metallocene-catalyzed elastomers and plastomers, copolymers of isobutylene and para-alkylstyrene, halogenated copolymers of isobutylene and para-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof. A preferred base rubber is 1,4-polybutadiene having a cis-bond structure of at least 40%, preferably greater than 80%, and more preferably greater than 90%.

Examples of commercially available polybutadiene rubbers that can be used in accordance with this invention include, but are not limited to, BUNA® CB22 and BUNA® CB23, commercially available from Lanxess Corp.; UBEPOL® 360L and UBEPOL® 150L and UBEPOL-BR rubbers, commercially available from UBE Industries, Ltd. of Tokyo, Japan; KINEX® 7245 and KINEX® 7265, commercially available from Goodyear of Akron, Ohio; SE BR-1220, and BUNA® CB1203G1, CB1220, and CB1221, commercially available from Lanxess Corp.; EUROPRENE® NEOCIS® BR 40 and BR 60, commercially available from Polimeri Europa; and BR 01, BR 730, BR 735, BR 11, and BR 51, commercially available from Japan Synthetic Rubber Co., Ltd; and Afdene 45, Afdene 50, Neodene 40, and Neodene 45, commercially available from Karbochem (PTY) Ltd. of Bruma, South Africa.

As discussed above, the polyalkenamer rubber composition may be cured using a conventional curing process. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy)valerate; 1,1-di(t-butylperoxy)3,3,5-trimethylcyclohexane; 2,5-dimethyl-2,5-di(t-butylperoxy)hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the base rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the base rubber. In one preferred version, the peroxide free-radical initiator is present in an amount of at least 2.5 and more preferably 5 parts per hundred (phr). As further discussed in the Examples below, it is believed the high crystallinity of the polyalkenamer rubber is reduced by adding the peroxide at relatively high amounts to the rubber composition and curing the composition so it is cross-linked.

The polyalkenamer rubber composition may further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the total rubber.

Radical scavengers such as a halogenated organosulfur, organic disulfide, or inorganic disulfide compounds may be added to the polyalkenamer rubber composition to increase the COR at a given compression. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The polyalkenamer compositions of the present invention also may include "fillers," which are added to adjust the density and/or specific gravity of the material. As used herein, the term "fillers" includes any compound or composition that can be used to adjust the density and/or other properties of the subject golf ball. Suitable fillers include, but are not limited to, polymeric or mineral fillers, metal fillers, metal alloy fillers, metal oxide fillers and carbonaceous fillers. Fillers can be in the form of flakes, fibers, fibrils, or powders. Regrind, which is ground, recycled core material (for example, ground to about 30 mesh particle size), can also be used. The amount and type of fillers utilized are governed by the amount and weight of other ingredients in the golf ball, since a maximum golf ball weight of 45.93 g (1.62 ounces) has been established by the United States Golf Association (USGA). Suitable fillers generally have a specific gravity from about 2 to 20. In one preferred embodiment, the specific gravity can be about 2 to 6.

Suitable polymeric or mineral fillers include, for example, precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium oxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used.

As discussed above, the rubber compositions may include antioxidants to prevent the breakdown of the elastomers. In addition, the polyalkenamer rubber compositions may optionally include processing aids such as high molecular weight organic acids and salts thereof. Suitable organic acids are aliphatic organic acids, aromatic organic acids, saturated mono-functional organic acids, unsaturated monofunctional organic acids, multi-unsaturated mono-functional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, dimerized derivatives thereof. The organic acids are aliphatic, mono-functional (saturated, unsaturated, or multi-unsaturated) organic acids. Salts of these organic acids may also be employed. The salts of organic acids include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending.)

Other ingredients such as accelerators (for example, tetra methylthiuram), processing aids, dyes and pigments, wetting agents, surfactants, plasticizers, coloring agents, fluorescent agents, chemical blowing and foaming agents, defoaming agents, stabilizers, softening agents, impact modifiers, antioxidants, antiozonants, as well as other additives known in the art may be added to the rubber composition. The core may be formed by mixing and molding the rubber composition using conventional techniques. These cores can be used to make finished golf balls by surrounding the core with outer core layer(s), intermediate layer(s), and/or cover materials as discussed further below.

In one embodiment, the polyalkenamer rubber composition may be used to make a solid, single core having a hard-to-soft gradient from the surface of the core to the center of the core, otherwise known as a "positive hardness gradient." In a second embodiment, the polyalkenamer rubber composition may be used to make a dual-core comprising a solid inner core and solid outer core layer that surrounds the inner core. The inner core has a positive hardness gradient, while the outer core layer, which surrounds the inner core, has a soft-to-hard gradient from the outer surface of the outer core layer to its inner surface, otherwise known as a "negative hardness gradient." In a third embodiment, the outer core layer has a zero hardness gradient.

As discussed above, the polyalkenamer rubber composition of this invention may be used in a wide variety of golf ball constructions, particularly single core and dual-core products. More particularly, in one version of the golf ball of this invention, the polyalkenamer rubber composition may be used to make a solid, single core having a positive hardness gradient. That is, the hardness of the outer surface of the core is greater than the hardness of the geometric center of the core. The positive hardness gradient preferably has a magnitude of at least 10 Shore C units and more preferably at least 20 Shore C units.

For example, the hardness of the outer surface of the core may be 70 Shore C or greater, or 75 Shore C or greater, or 80 Shore C or greater, or 85 Shore C or greater, or 87 Shore C or greater, or 90 Shore C or greater. Meanwhile, the geometric center of the core may have a hardness of 70 Shore C or less, or 65 Shore C or less; or 60 Shore C or less; or within a range having a lower limit of 30 or 40 or 45 Shore C and an upper limit of 70 or 75 or 80 Shore C; or a center hardness of about 60 Shore C. In other instances, the hardness gradient may have a magnitude of less than 8 Shore C units to define a zero hardness gradient. For example, the hardness of the outer surface of the core may range from 52 Shore C to 68 Shore C and the hardness of the center of the core may range from 49 Shore C to 63 Shore C to define a zero hardness gradient.

The single-layered core of this invention may be enclosed with one or two cover layers. In one embodiment, a multi-layered cover comprising inner and outer cover layers is formed, where the inner cover layer has a thickness of about 0.01 inches to about 0.06 inches, more preferably about 0.015 inches to about 0.040 inches, and most preferably about 0.02 inches to about 0.035 inches. In this version, the inner cover layer is formed from a partially- or fully-neutralized ionomer having a Shore D hardness of greater than about 55, more preferably greater than about 60, and most preferably greater than about 65. The outer cover layer, in this embodiment, preferably has a thickness of about 0.015 inches to about 0.055 inches, more preferably about 0.02 inches to about 0.04 inches, and most preferably about 0.025 inches to about 0.035 inches, with a hardness of about Shore D 60 or less, more preferably 55 or less, and most preferably about 52 or less. The inner cover layer is harder than the outer cover layer in this version.

A preferred outer cover layer is a castable or reaction injection molded polyurethane, polyurea or copolymer, blend, or hybrid thereof having a Shore D hardness of about 40 to about 50. A preferred inner cover layer material is a partially-neutralized ionomer comprising zinc, sodium or lithium neutralized ionomer such as SURLYN 8940, 8945, 9910, 7930, 7940, or blend thereof having a Shore D hardness of about 63 to about 68. In another multi-layer cover, single core embodiment, the outer cover and inner cover layer materials and thickness are the same but, the hardness range is reversed, that is, the outer cover layer is harder than the inner cover layer.

As discussed above, ionomer-based compositions, particularly olefin-based ionomers, are known to be useful as a golf ball cover material, particularly as an inner cover layer, because they can impart desirable hardness to the ball. Olefin-based ionomers are acid copolymers that normally include α-olefin, such as ethylene and an α,β-ethylenically unsaturated carboxylic acid having 3 to 8 carbons, such as methacrylic acid or acrylic acid. Other possible carboxylic acid groups include, for example, crotonic, maleic, fumaric, and itaconic acid. The acid copolymers may optionally contain a softening monomer such as alkyl acrylate and alkyl methacrylate, wherein the alkyl groups have from 1 to 8 acarbon atoms. "Low acid" and "high acid" olefin-based ionomers, as well as blends of such ionomers, may be used. In general, low acid ionomers are considered to be those containing 16 wt. % or less of carboxylic acid, whereas high acid ionomers are considered to be those containing greater than 16 wt. % of carboxylic acid. The acidic group in the olefin-based ionic copolymer is partially or totally neutralized with metal ions such as zinc, sodium, lithium, magnesium, potassium, calcium, manganese, nickel, chromium, copper, or a combination thereof. For example, ionomeric resins having carboxylic acid groups that are neutralized from about 10 percent to about 100 percent may be used. In one embodiment, the acid groups are partially neutralized. That is, the neutralization level is from 10 to 80%, more preferably 20 to 70%, and most preferably 30 to 50%. In another embodiment, the acid groups are highly or fully neutralized. That is, the neutralization level is from 80 to 100%, more preferably 90 to 100%, and most preferably 95 to 100%.

In another version, the polyalkenamer rubber composition may be used to may a dual-core comprising a solid inner core and solid outer core layer that surrounds the inner core. In one preferred version, the polyalkenamer rubber composition is used to make an inner core having a positive hardness gradient as described above. The positive hardness gradient preferably has a magnitude of at least 10 Shore C units and more preferably at least 20 Shore C units.

Meanwhile, the outer core layer, which surrounds the inner core, may have an outer surface hardness substantially the same or less than its inner surface hardness to define a zero or negative hardness gradient. The outer core layer may be made of the polyalkenamer rubber composition or a traditional rubber composition used for golf ball cores such as, for example, polybutadiene, as described above. In still another version, the inner core may have a positive hardness gradient as described above and the hardness gradient from outer surface of the outer core layer to the inner surface of the outer core layer also may be positive. For dual-core and other multi-layered core constructions, the polyalkenamer rubber composition is used in at least one of the core layers.

The positive and negative hardness gradients, particularly in the above embodiments, can have any slope (i.e., steep, shallow, or substantially flat). In a preferred version, the golf ball contains a dual-core, wherein the inner core has a steep positive hardness gradient and the outer core layer has a zero or negative hardness gradient of varying slope. For example, in one embodiment, the golf ball has a dual-core, wherein the inner core has a steep positive hardness gradient of 20 Shore C or greater, more preferably 25 Shore C or greater, most preferably 30 Shore C or greater, and the outer core layer has a gradual zero or negative gradient of −1 to −5 Shore C, more preferably −2 to −5 Shore C, most preferably −2 to −4 Shore C. More particularly, in one embodiment, the hardness of the outer surface of the outer core layer may range from 42 Shore C to 60 Shore C and the hardness of the inner surface of the outer core layer may range from 52 Shore C to 65 Shore C to define a zero or negative hardness gradient.

Figure 2:
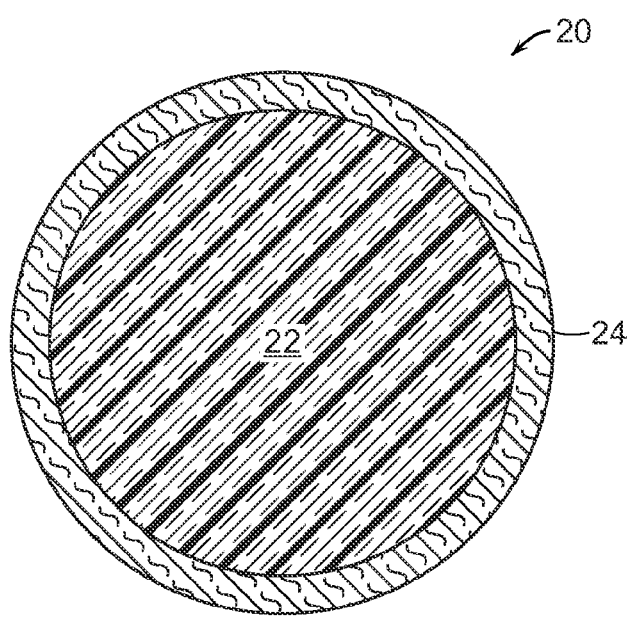
FIG. 2 is a cross-sectional view of a two-piece golf ball having an inner core made of a polyalkenamer rubber composition and a cover layer made of a polyurethane composition in accordance with the present invention.
Figure 3:
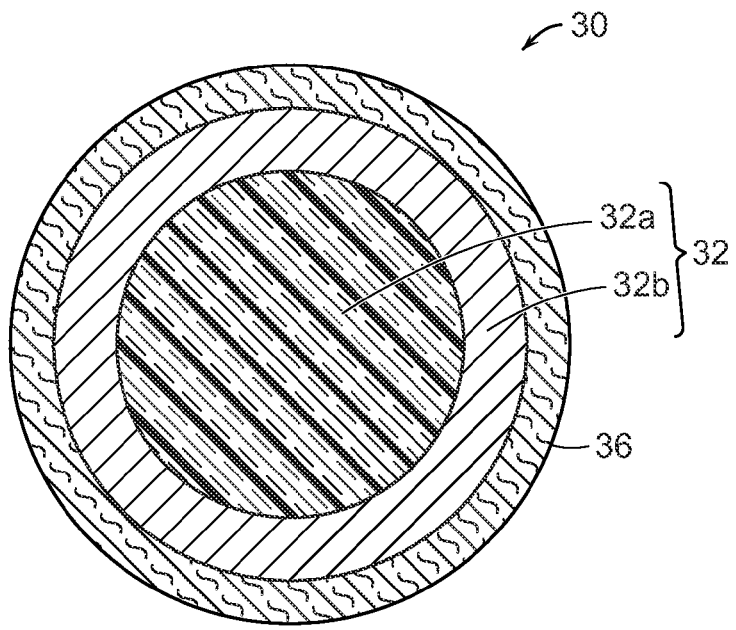
FIG. 3 is a cross-sectional view of a three-piece golf ball having a dual-core comprising an inner core and outer core made of polyalkenamer rubber compositions and a cover layer made of a polyurethane composition in accordance with the present invention.
Figure 4:
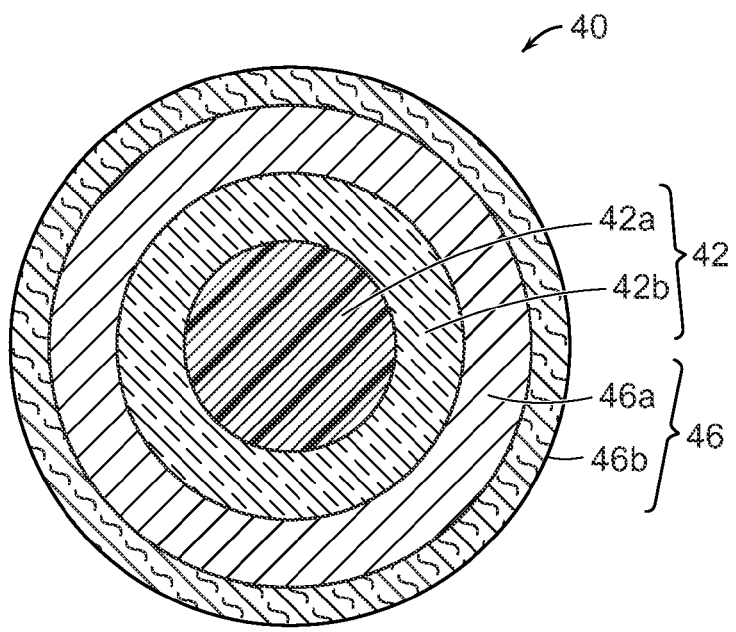
FIG. 4 is a cross-sectional view of a four-piece golf ball having a dual-core comprising an inner core and outer core made of polyalkenamer rubber compositions; an inner cover layer made of an ethylene-based acid ionomer; and an outer cover layer made of a polyurethane composition in accordance with the present invention.
Figure 5:
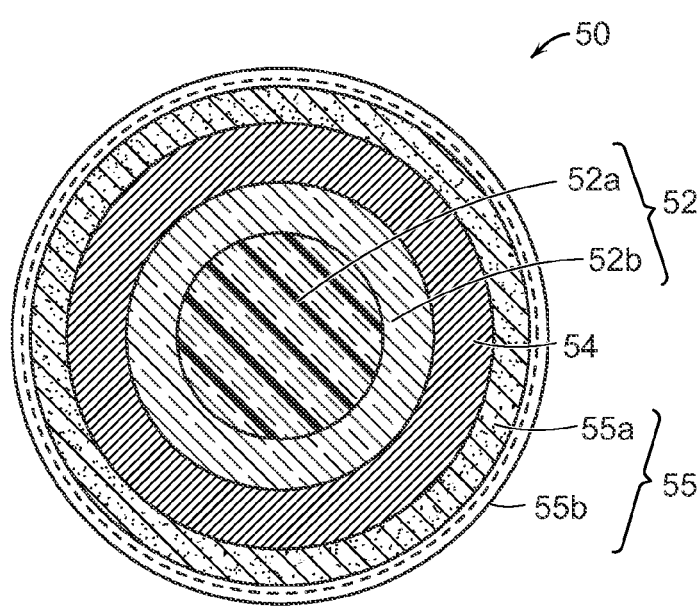
FIG. 5 is a cross-sectional view of a five-piece golf ball having a dual-core comprising an inner core and outer core made of polyalkenamer rubber compositions made in accordance with the present invention.

As discussed above, the polyalkenamer rubber materials of this invention may be used with any type of ball construction known in the art. Such golf ball designs include, for example, two-piece, three-piece, four-piece, and five-piece designs. The core, intermediate casing, and cover material can be single or multi-layered. Referring to FIG. 1, one version of a golf ball that can be made in accordance with this invention is generally indicated at (10). Various patterns and geometric shapes of dimples (11) can be used to modify the aerodynamic properties of the golf ball (10). The dimples (11) can be arranged on the surface of the ball (10) using any suitable method known in the art. Referring to FIG. 2, a two-piece golf ball (20) that can be made in accordance with this invention is illustrated. In this version, the ball (20) includes a solid, single inner core (22) made of a polyalkenamer rubber composition and polyurethane cover (24). In FIG. 3, a three-piece golf ball (30) having a dual-core (32) comprising an inner core (32a) and outer core layer (32b) made of polyalkenamer rubber compositions and polyurethane cover (36) is shown. In another embodiment, as shown in FIG. 4, the four-piece golf ball (40) contains a dual-core (42) comprising an inner core (42a) and outer core layer (42b) made of polyalkenamer rubber compositions. The golf ball (40) further includes a multi-layer cover (46) comprising inner cover (46a) and outer cover (46b) layers. Conventional thermoplastic or thermoset resins such as olefin-based ionomeric copolymers, polyamides, polyesters, polycarbonates, polyolefins, polyurethanes, and polyureas as described above can be used to make the inner and outer cover layers. Turning to FIG. 5 in yet another version, a five-piece golf ball (50) containing a dual-core (52) comprising an inner core (52a) and outer core layer (52b) can be made. This ball includes an intermediate layer (54) and a multi-layered cover (55) comprising an inner cover layer (55a) and outer cover layer (55b). As used herein, the term, "intermediate layer" means a layer of the ball disposed between the core and cover. The intermediate layer may be considered an outer core layer or inner cover layer or any other layer disposed between the inner core and outer cover of the ball. The intermediate layer also may be referred to as a casing or mantle layer. The intermediate layer may be made of any suitable material known in the art including thermoplastic and thermosetting materials, particularly ionomeric or non-ionomeric materials.

In one version, the intermediate layer comprises highly-neutralized polymers and blends thereof ("HNP"). The acid moieties of the HNP'S, typically ethylene-based ionomers, are preferably neutralized greater than about 70%, more preferably greater than about 90%, and most preferably at least about 100%. The HNP's can be also be blended with a second polymer component, which, if containing an acid group, may be neutralized in a conventional manner The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D.

Test Methods

Hardness. The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball subassembly is centered under the durometer indentor before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conform to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore C hardness was measured according to the test methods D-2240.

Moment of Inertia. Moment of Inertia (MOI) is measured on a model MOI-005-104 Moment of Inertia Instrument manufactured by Inertia Dynamics of Collinsville, Conn. The instrument is connected to a PC for communication via a COMM port and is driven by MOI Instrument Software Version #1.2

Compression. As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading. Conversion from Atti compression to Riehle (cores), Riehle (balls), 100 kg deflection, 130-10 kg deflection or effective modulus can be carried out according to the formulas given in J. Dalton.

Coefficient of Restitution ("COR"). The COR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculates as the ratio of the ball's outgoing transit time period to the ball's incoming transit time period ($COR=V_{out}/V_{in}=T_{in}/T_{out}$).

EXAMPLES

It should be understood that the examples below are for illustrative purposes only. In no manner is the present invention limited to the specific disclosures therein.

Example 1

Twelve ionomeric inner cover layer compositions according to the present invention were prepared by melt blending Surlyn® 8150 and Fusabond® 572D in a twin screw extruder, at a temperature of at least 450° F. (230° C.). The relative amounts of each component used are indicated in Table 1. Flex bars of each blend composition were formed and evaluated for hardness according to ASTM D2240 following 10 days of aging at 50% relative humidity and 23° C. The results are reported below in Table 1.

TABLE 1

(Inner Cover Layer Compositions)

| Example | Surlyn® 8150, wt % | Fusabond® 572D, wt % | Shore C Hardness at 10 Days |
|---|---|---|---|
| 1 | 89 | 11 | 91.2 |
| 2 | 84 | 16 | 89.8 |
| 3 | 84 | 16 | 90.4 |
| 4 | 84 | 16 | 89.6 |

TABLE 1-continued (Inner Cover Layer Compositions)

| Example | Surlyn® 8150, wt % | Fusabond® 572D, wt % | Shore C Hardness at 10 Days |
|---|---|---|---|
| 5 | 81 | 19 | 88.9 |
| 6 | 80 | 20 | 89.1 |
| 7 | 78 | 22 | 88.1 |
| 8 | 76 | 24 | 87.6 |
| 9 | 76 | 24 | 87.2 |
| 10 | 73 | 27 | 86.6 |
| 11 | 71 | 29 | 86.7 |
| 12 | 67 | 33 | 84.0 |

Example 2

In this Example, a slug of a rubber composition having the formulation described in Table 2 was cured at about 350° F. for about 11 minutes to make a solid, single-layered core. The resulting core had a center hardness of about 57 Shore C and a surface hardness of about 89 Shore C providing a positive hardness gradient. In addition, the core had a compression of about 90 and a COR of about 0.790 @125 f/s (1.550 inch diameter solid sphere.)

TABLE 2

(Core Compositions)

| Core Composition | Concentration (parts per hundred) |
|---|---|
| Vestenamer® 8012 —polyoctenamer rubber available from Evonik Degussa GmbH. | 90 |
| Buna® CB 23 —polybutadiene rubber Available from Lanxess Corp. | 10 |
| Zinc diacrylate (ZDA) co-agent | 50 |
| Zinc oxide (ZnO) filler | 13 |
| Perkadox® BC free-radical initiator * peroxide free-radical initiator available from Akzo Nobel. | 5 |
| Zinc pentachlorothiophenol (ZnPCTP) | 1 |

Example 3

In this Example, slugs of different polyalkenamer rubber compositions having the formulations described in Table 3 were cured at different temperature/time cycles as described in Table 4 to make solid, single-layered core samples. Concentrations are in parts per hundred (phr) unless otherwise indicated. As used herein, the term "parts per hundred," also known as "phr," is defined as the number of parts by weight of a particular component present in a mixture, relative to 100 parts by weight of the base rubber component. Mathematically, this can be expressed as the weight of an ingredient divided by the total weight of the polymer, multiplied by a factor of 100.

TABLE 3

(Core Compositions Containing 100% Polyalkenamer as Base Rubber)

| Sample | Base Rubber | ZDA Co-agent (phr) | Peroxide Free-Radical Initiator (phr) | Zinc Oxide Filler (phr) | Soft and Fast Agent (phr) |
|---|---|---|---|---|---|
| A | Vestenamer* 8012 | 0 | 0 | 0 | 0 |
| B | Vestenamer 8012 | 0 | 2.50 parts Varox* 231-XL | 0 | 0 |
| C | Vestenamer 8012 | 0 | 5.00 parts Varox 231-XL | 0 | 0 |
| D | Vestenamer 8012 | 33.5 parts SR-526* | 0.85 parts Perkadox* BC | 19.9 parts ZnO* | 0 |
| E | Vestenamer 8012 | 33.5 parts SR-526 | 1.75 parts Perkadox BC | 19.9 parts ZnO | 0 |
| F | Vestenamer 8012 | 33.5 parts SR-526 | 3.00 parts Perkadox BC | 19.9 parts ZnO | 0 |
| G | Vestenamer 8012 | 33.5 parts SR-526 | 5.00 parts Perkadox BC | 19.9 parts ZnO | 0 |
| H | Vestenamer 8012 | 33.5 parts SR-526 | 5.00 parts Perkadox BC | 19.9 parts ZnO | 1.0 parts ZnPCTP* |
| I | Vestenamer 8012 | 50 parts SR-526 | 1.00 parts Perkadox BC | 13.0 parts ZnO | 1.0 parts ZnPCTP |
| J | Vestenamer 8012 | 50 parts SR-526 | 1.00 parts Perkadox BC | 13.0 parts ZnO | 1.0 parts ZnPCTP |
| K | Vestenamer 8012 | 50 parts SR-526 | 2.00 parts Perkadox BC | 13.0 parts ZnO | 1.0 parts ZnPCTP |
| L | Vestenamer 8012 | 50 parts SR-526 | 2.00 parts Perkadox BC | 13.0 parts ZnO | 1.0 parts ZnPCTP |

TABLE 4

(Curing Cycle and Properties for Core Samples)

| Sample | Cure Temp (° F.) | Cure Time (Minutes) | DCM (Compression) | COR | Shore C Hardness |
|---|---|---|---|---|---|
| A | No Heat-Curing | No Heat-Curing | 102 | 0.568 | 75 |
| B | 350° F. | 12 Min. | 47 | 0.617 | 41 |
| C | 350° F. | 12 Min. | −62 | 0.687 | — |
| D | 350° F. | 11 Min. | 60 | 0.767 | 80.4 |
| E | 350° F. | 11 Min. | 68 | 0.778 | 82.9 |
| F | 350° F. | 11 Min. | 79 | — | 85.9 |
| G | 350° F. | 11 Min. | 75 | 0.780 | 87.6 |
| H | 350° F. | 11 Min. | 56 | 0.788 | 83.8 |
| I | 330° F. | 11 Min. | 91 | 0.794 | 85.9 |
| J | 350° F. | 11 Min. | 94 | 0.795 | 89 |
| K | 330° F. | 11 Min. | 98 | 0.792 | 90.7 |
| L | 350° F. | 11 Min. | 99 | 0.796 | 90.7 |

Example 4

In this Example, slugs of different polyalkenamer rubber compositions having the formulations described in Table 5 were cured at different temperature/time cycles as described in Table 6 to make solid, single-layered core samples.

TABLE 5

(Core Compositions Containing Blends of Polyalkenamer and Polybutadiene Rubber)

| Sample | Base Rubber | Secondary Rubber | ZDA Co-agent (phr) | Peroxide Free-Radical Initiator (phr) | Zinc Oxide Filler (phr) | Soft and Fast Agent (phr) |
|---|---|---|---|---|---|---|
| M | 80 parts Vestenamer 8012 | 20 parts Buna CB 23 | 40 parts SR-526 | 1 part Perkadox BC | 23.5 parts ZnO | 1 part ZnPCTP |
| N | 80 parts Vestenamer 8012 | 20 parts Buna CB 23 | 40 parts SR-526 | 1 part Perkadox BC | 23.5 parts ZnO | 1 part ZnPCTP |
| O | 80 parts Vestenamer 8012 | 20 parts Buna CB 23 | 40 parts SR-526 | 3 parts Perkadox BC | 23.5 parts ZnO | 1 part ZnPCTP |
| P | 80 parts Vestenamer 8012 | 20 parts Buna CB 23 | 40 parts SR-526 | 3 parts Perkadox BC | 23.5 parts ZnO | 1 part ZnPCTP |
| Q | 80 parts Vestenamer 8012 | 20 parts Buna CB 23 | 30 parts SR-526 | 1 part Perkadox BC | 26 parts ZnO | 2 parts ZnPCTP |
| R | 80 parts Vestenamer 8012 | 20 parts Buna CB 23 | 30 parts SR-526 | 1 part Perkadox BC | 26 parts ZnO | 2 parts ZnPCTP |
| S | 80 parts Vestenamer 8012 | 20 parts Buna CB 23 | 30 parts SR-526 | 2 parts Perkadox BC | 26 parts ZnO | 2 parts ZnPCTP |
| T | 80 parts Vestenamer 8012 | 20 parts Buna CB 23 | 30 parts SR-526 | 2 parts Perkadox BC | 26 parts ZnO | 2 parts ZnPCTP |

* Buna ® CB-23 - polybutadiene rubber available from Lanxess Corp.

TABLE 6

(Curing Cycle and Properties for Core Samples)

| Sample | Cure Temp (° F.) | Cure Time (Minutes) | DCM (Compression) | COR | Shore C Hardness |
|---|---|---|---|---|---|
| M | 350° F. | 11 Min. | 89 | 0.789 | 51.4 |
| N | 330° F. | 11 Min. | 89 | 0.788 | 51.7 |
| O | 350° F. | 11 Min. | 99 | | 58.9 |
| P | 330° F. | 11 Min. | 96 | | 58.6 |
| Q | 350° F. | 11 Min. | 51 | 0.778 | 43.2 |
| R | 330° F. | 15 Min. | 54 | 0.780 | 44.5 |
| S | 350° F. | 11 Min. | 57 | 0.780 | 46.9 |
| T | 330° F. | 15 Min. | 59 | 0.780 | 48.6 |

In above Tables 3 and 4, the sample cores are made of rubber compositions containing 100% Vestenamer® 8012—polyoctenamer rubber (Samples A-L), while in Tables 5 and 6, the sample cores (M-T) are made of rubber compositions containing 80% Vestenamer 8012 and 20% Buna CB 23—polybutadiene rubber (Samples M-T).

In each of the samples, when the peroxide free-radical initiator is added to the rubber composition and heat and pressure are applied, a complex curing reaction occurs. In general, the resulting cross-linked core compositions have higher COR values. Cores with higher COR values have higher rebound velocities. These high COR cores (and golf balls made with such cores) generally rebound faster, retain more total energy when struck with a club, and have longer flight distance. The relatively high resiliency of the core means that it will reach a higher velocity when struck by a golf club and travel longer distances.

Surprisingly, however, the compression of the polyalkenamer rubber core composition in the above inventive samples does not increase substantially as the COR increases, as would be expected with conventional polybutadiene rubber cores. Rather, the compression of the polyalkenamer rubber core remains substantially the same or is reduced as the COR increases. While not wishing to be bound by any theory, it is believed the high crystallinity of the polyalkenamer rubber is reduced by adding the peroxide, particularly at relatively high amounts, as shown in Samples C and H (5 phr peroxide), and curing the composition so the rubber chains are cross-linked. This may cause the compression or stiffness of the polyalkenamer rubber composition to be reduced. Adding the peroxide at these high levels and curing and cross-linking the composition may disrupt the crystallinity of polyalkenamer. The material becomes softer and more rubbery, and the compression of the core sample is reduced. The compression of the core affects the "feel" of the ball as the club face makes impact with the ball. In general, cores with relatively low compression values have a softer feel. Golf balls made with such cores tend to have better playability and the sensation of hitting such balls is generally more pleasant. Furthermore, in general, when the ball contains a relatively soft core, the resulting spin rate of the ball is relatively low. The compressive force acting on the ball is less when the cover is compressed by the club face against a relatively soft core.

Hardness Gradients

Figure 6:
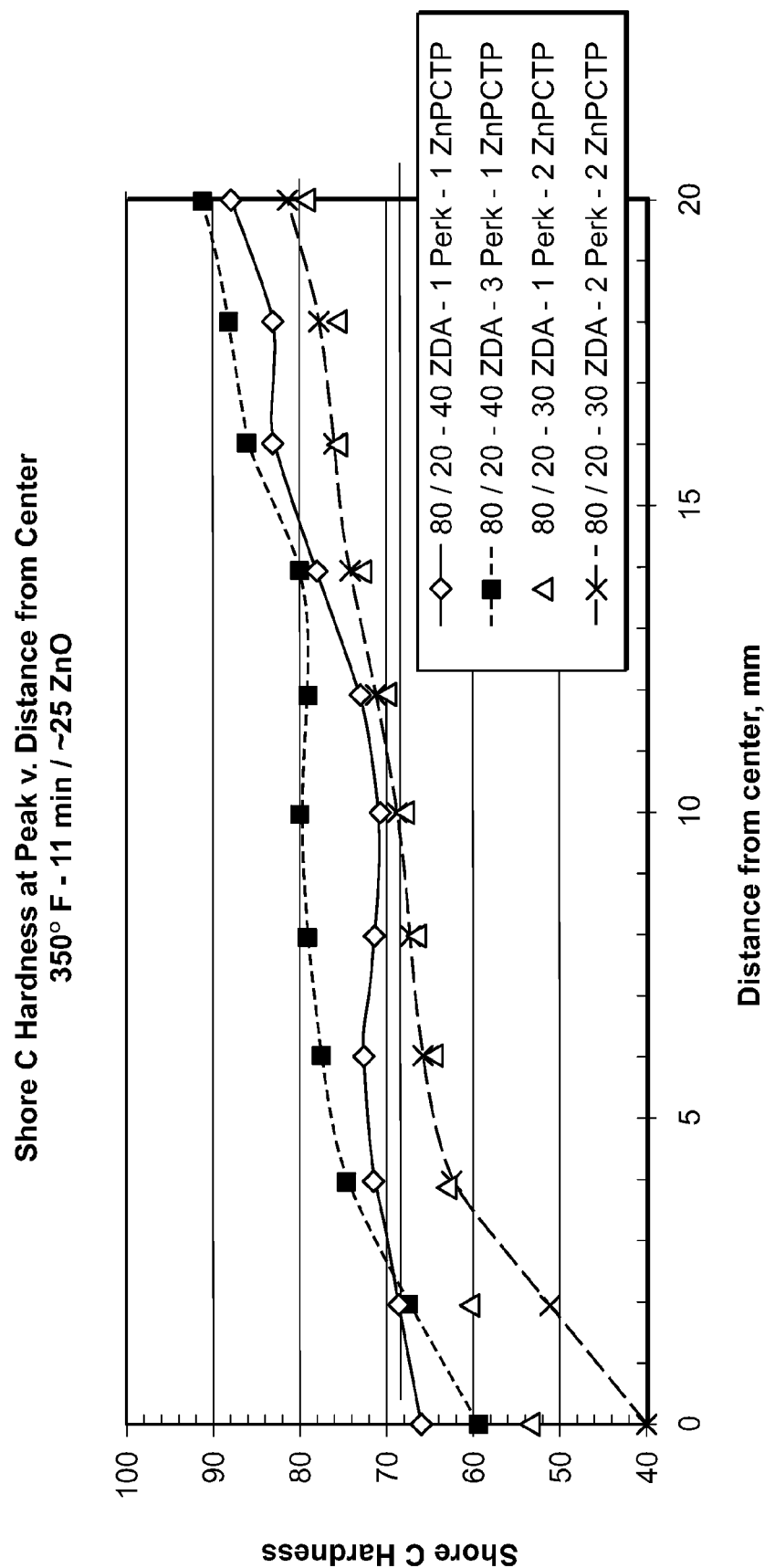
FIG. 6 is a graph of the hardness values of different core samples as measured at different points extending radially from the center of the core.

Referring to the graph in FIG. 6, the hardness values of different core samples from Tables 5 and 6, as measured at different points extending radially from the center of the core, are plotted. Each of the sample cores in FIG. 6 has a positive hardness gradient.

When numerical lower limits and numerical upper limits are set forth herein, it is contemplated that any combination of these values may be used. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary techniques.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

We claim:

1. A golf ball, comprising a solid, single core having an outer surface and a geometric center, the core being formed from a rubber composition, the rubber composition comprising a cycloalkene rubber having a trans-bond content of 55% or greater and a melting point of 30° C. or greater in an amount of 80 weight percent, and polybutadiene rubber having a cis-bond content of at least 40% in an amount of 20 weight percent, and peroxide in an amount of 2.5 phr or greater based on weight of the cycloalkene rubber, wherein the geometric center and the outer surface each has a hardness, the hardness of the outer surface being greater than the hardness of the geometric center to define a positive hardness gradient of at least 10 Shore C units; and a cover layer surrounding the core.

2. The golf ball of claim 1, wherein the cycloalkene rubber has a trans-content of 75% or greater and a melting point of 50° C. or greater.

3. The golf ball of claim 1, wherein the diameter of the core is from 1.51 to 1.59 inches.

4. The golf ball of claim 1, wherein the hardness of the center is in the range of 50 to 80 Shore C units.

5. The golf ball of claim 1, wherein the hardness of the center is in the range of 55 to 75 Shore C units.

6. The golf ball of claim 1, wherein the hardness of the outer surface is at least 70 Shore C units.

7. The golf ball of claim 1, wherein the hardness of the outer surface is in the range of 80 to 95 Shore C units.

8. The golf ball of claim 1, wherein the hardness of the outer surface is 80 to 95 Shore C units and the hardness of the center is 50 to 60 Shore C units.

9. The golf ball of claim 1, wherein the positive hardness gradient is at least 25 Shore C units.

10. The golf ball of claim 1, wherein the cover layer comprises an inner cover layer and an outer cover layer.

11. The golf ball of claim 10, wherein the outer cover layer has a material hardness less than the inner cover layer.

* * * * *